Aug. 30, 1938.   H. B. ATHERTON   2,128,667
TRANSPORTATION APPARATUS
Filed Aug. 13, 1936   2 Sheets-Sheet 1
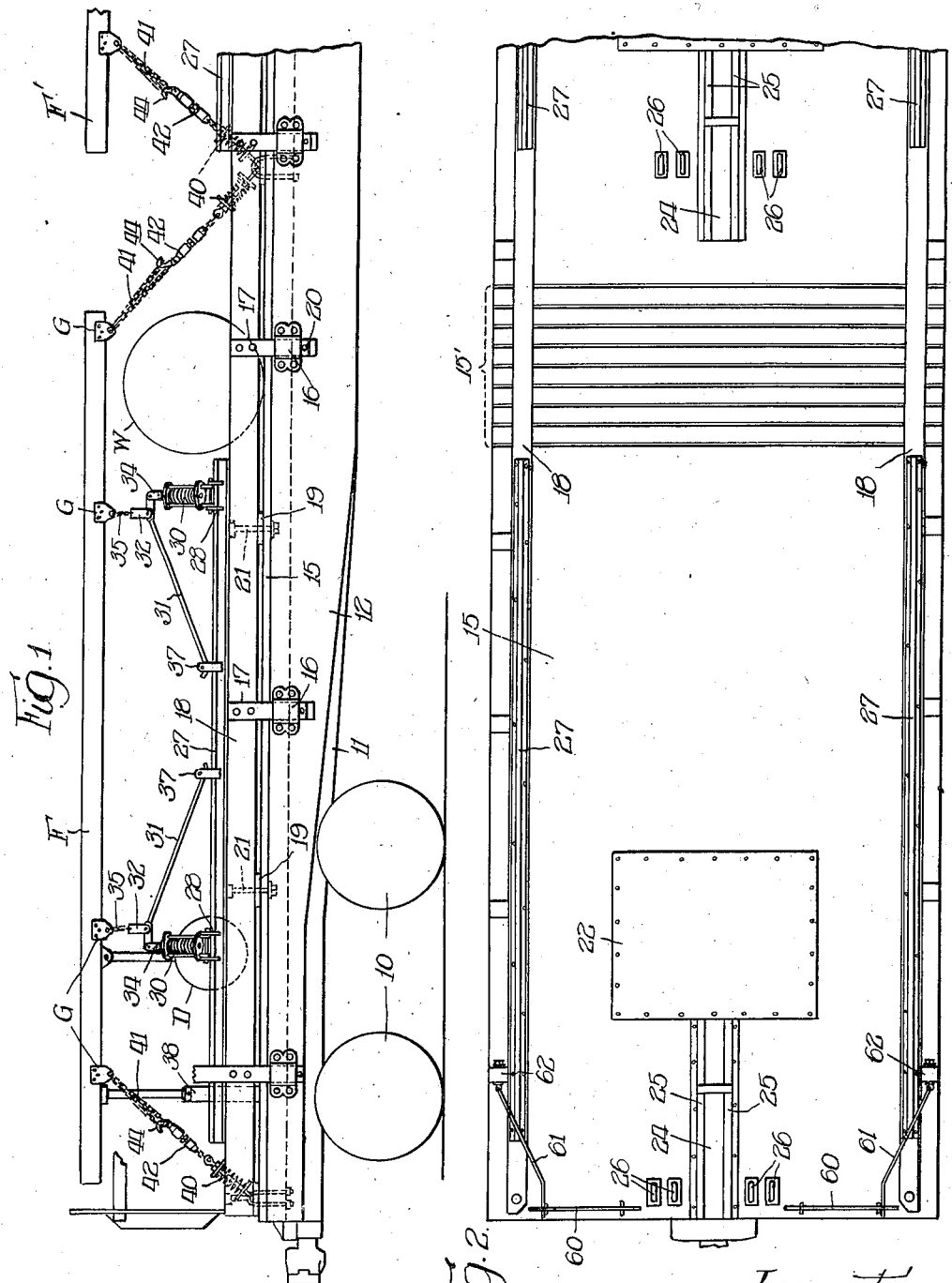
Inventor:
Howard B. Atherton,
By Cromwell Greist Kleeman
attys.

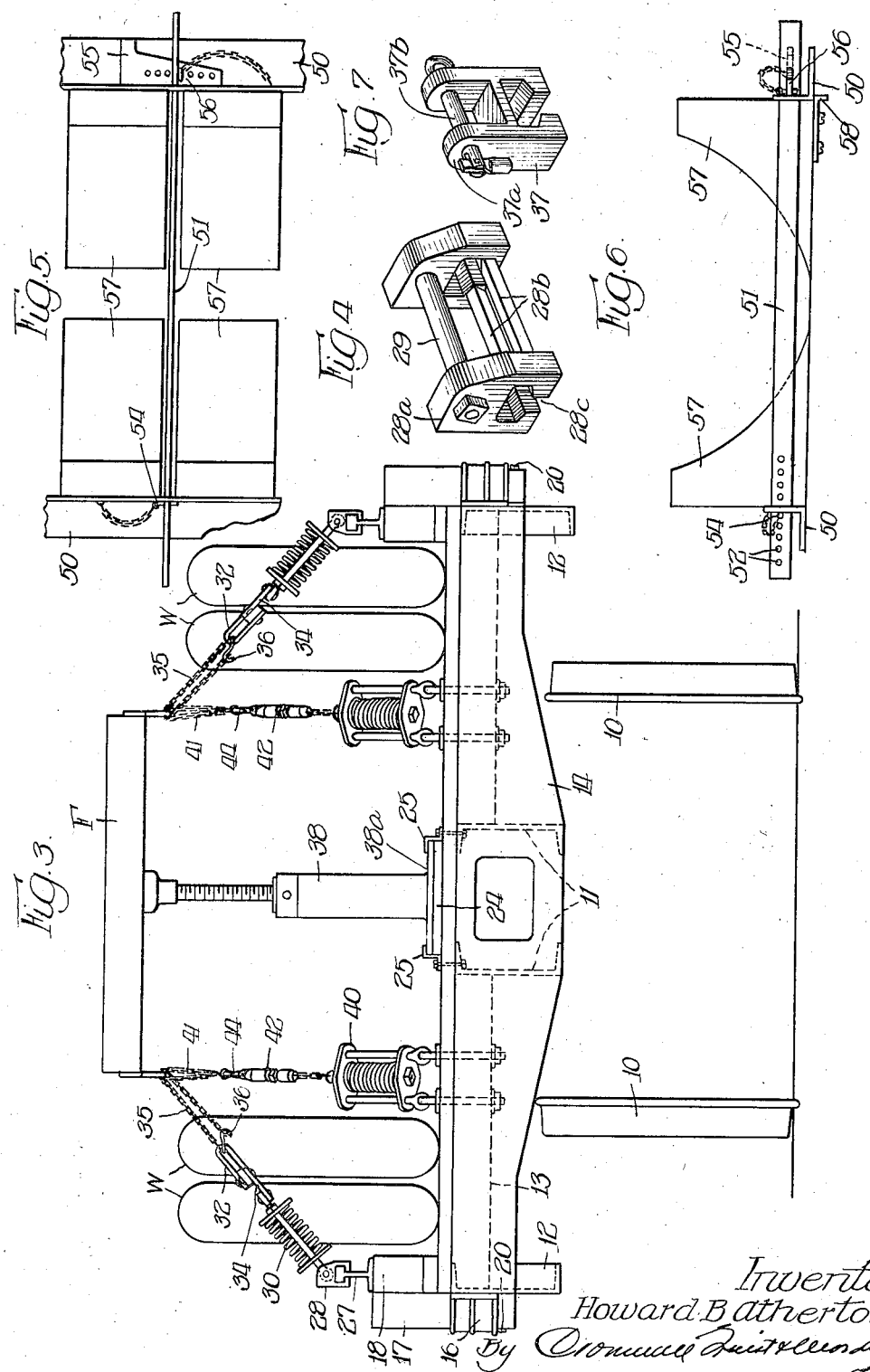

Patented Aug. 30, 1938

2,128,667

UNITED STATES PATENT OFFICE 2,128,667

TRANSPORTATION APPARATUS

Howard B. Atherton, Chicago, Ill., assignor to Patrick H. Joyce and Luther M. Walter, as trustees of Chicago Great Western Railroad Company, a corporation of Illinois Application August 13, 1936, Serial No. 95,755

7 Claims. (Cl. 105—368)

This invention relates to transportation apparatus and pertains particularly to the transportation of wheeled road vehicles, such as motor trucks, trailers or semi-trailers, on railway cars, barges, or the like. The invention has to do primarily with equipment whereby such vehicles may be securely retained on a carrying vehicle for transport thereon.

A general object of the invention is the provision of a carrying vehicle which is so equipped as to facilitate the loading of wheeled road vehicles thereonto and the unloading of such road vehicles therefrom and to maintain such road vehicles securely in place on the carrying vehicle incident to the traveling movements and the starting and stopping of the latter.

Another object is the provision of such equipment which is adaptable to the mounting and securing of road vehicles of different sizes, and which is operable with speed and facility and capable of withstanding hard usage without disablement.

Yet another object is the provision of such equipment which may be easily incorporated with customary features and parts of standard railway cars, and which is in large measure comprised of duplicate or interchangeable parts or elements.

Another object is the provision of such equipment which does not incapacitate the carrying vehicle for use in the transportation of other freight.

Other and further objects of the invention are pointed out and indicated hereinafter or will be apparent to one skilled in the art upon a full understanding of the invention or its employment in use.

For the purpose of aiding in an explanation of the invention, I show in the accompanying drawings forming a part of this specification, a structural form in which it may be embodied and including various component parts of certain form. It is to be understood, however, that these are presented merely for purpose of illustration and are not to be construed in any fashion calculated to limit the appended claims short of the true and most comprehensive scope of the invention in the art.

In said drawings,

Fig. 1 represents a side elevational view of a portion of a railway car representing an embodiment of the invention;

Fig. 2 is a plan view of the same portion of the car but with various parts shown in Fig. 1 omitted;

Fig. 3 is an end view of the railway car on somewhat larger scale;

Fig. 4 is a detail in the nature of a perspective view of a form of anchor yoke which may be utilized in the apparatus;

Fig. 5 is a plan view of a chocking device which may be employed in the equipment;

Fig. 6 is a side elevational view of such chocking device; and

Fig. 7 is a detail in the nature of a perspective view of a keeper device.

The nature of the invention will be most quickly ascertained from a detailed description of the structures shown in the drawings.

The structure here illustrated represents an embodiment of the invention in a railway flat car, slightly more than one-half of the length of the car being shown. The track wheels, which are designated by the reference numeral 10, carry the customary railway car truck structure upon which is supported the under frame of the car with its longitudinal sill members including center sills 11 and side sills 12, and customary transversals including end sills 14. The car deck 15 is formed of planking secured in the customary fashion to longitudinal frame members. In these, as in all other particulars, the car frame, draft and brake equipment may be of standard construction.

On the side sills are mounted stake sockets 16 spaced at suitable intervals and these receive stakes 17 which are rigidly bolted to guard rails 18. These guard rails are stout timber members which extend substantially the full length of the car deck and are disposed adjacent its margins, resting on shims or spacers 19 at suitable intervals. Lag screws 20 are set into the lower ends of the stakes 17 below the sockets 16, to hold the stakes against withdrawal upwardly, and the guard rails 18 are further secured in place by being bolted to the top flanges of the side sills by bolts 21. The guard rails 18 are thus secured rigidly in positions wherein they extend upwardly for several inches from the car deck 15.

At appropriate locations on the car deck are secured wear plates 22, for a purpose hereinafter explained, and adjacent these are jack plates 24, likewise fastened flat upon the car deck and positioned along the median portion thereof. At the sides of the jack plates 24 are disposed Z-bars 25 rigidly secured to the deck with their upper horizontal flanges presented toward each other. Firmly secured and anchored to the center sills or to other strong under-frame members are U-shaped anchor bolts 26 having their bends projecting a short distance above the deck planking. These U-shaped anchor bolts are arranged in pairs at opposite sides of the jack plates 24.

On top of the guard rails 18 are rigidly secured the anchor rails 27, which may be light railway rails. These afford a retaining anchorage for anchor yokes 28. These may be of the form illustrated in Fig. 4, comprising jaw members 28a which are rigidly connected by spacer bars 28b and provided with T-shaped slots 28c adapted to accommodate the head and upper web portion of an anchor rail so as to be retained thereon. In the upper portions of the connected jaw members 28a is mounted a bolt 29, and on this bolt is hinged a spring coupling 30. This spring coupling contains a strong helical spring arranged to receive and resiliently resist pull on the sliding draw bolts of the coupling. Each of the said anchor yokes 28, together with the spring coupling which is connected thereto, constitutes part of a lateral hold-down device. Such lateral hold-down device includes also a lever 31 pivoted in a clevis 32 and having its shorter arm connected by links 34 to the center draw bolt of the spring coupling. In the loop of the clevis 32 is connected a chain 35 and hook 36. A keeper 37 is provided for the long arm of the lever 31, said keeper comprising a jaw-like member adapted, as illustrated in Fig. 7, for retentive engagement with the anchor rail and having upstanding spaced flanges 37a adapted to receive the end of the long arm of lever 31 between them, where it may be secured by a pin 37b removably seated in said upstanding flanges.

Four of the lateral hold-down devices above described are arranged for cooperation with each road vehicle mounted on the car. In Figs. 1 and 3 are illustrated diagrammatically portions of a semi-trailer mounted on the car, under frame portions of the trailer being designated by the reference character F, the road wheels by the reference character W, and the dolly wheels by the reference character D. Such trailer is run onto the car at an end thereof until the dolly wheels are over the wear plate 22, which plate is provided for the purpose of protecting the deck planking from the wear of the dolly wheels, which ordinarily are steel tired. The wheels W rest upon the deck at locations more or less inwardly from the guard rails 18. A jack 38 has its base plate 38a engaged under the upper flanges of the Z-bars 25 and resting on the jack plate 24. This jack may be slid longitudinally of the jack plate to a suitable location under the frame of the trailer, and operated to raise the front end of the trailer to take the weight off of the dolly wheels. Said jack plate and Z-bars thus constitute a guide and retaining support for the jack, and serve to hold it in upright position to support the weight of the front portion of the trailer.

The under or chassis frame F of the carried vehicle is provided, at suitable locations, with strong anchor connections G affording eyes or apertures for receiving chains 35 of the lateral hold-down devices, there preferably being two of said lateral hold-down devices associated with each side of the road vehicle. By virtue of the sliding connection between the lateral hold-down devices and the anchor rails afforded by the anchor yokes 28, the lateral hold-down devices may be adjusted longitudinally on the anchor rails to positions approximately opposite the selected anchor connections G. The lever arms 31 being in raised position, the chains 35 of the respective lateral hold-down devices are passed through the eyes or apertures of the anchor connections G and drawn as taut as possible and the free end portions of the respective chains hooked in the respective hooks 36. Then the long arms of the levers 31 are forced downwardly and secured in the keepers 37. Thus the springs of the spring couplings are put under compression, and very strong and taut, though flexible and resilient, lateral anchorage connections provided between the road vehicle frame F and the under frame members of the railway car. These lateral anchorage connections hold the road vehicle against shifting laterally on the car deck, and have the further important function of anchoring the body of the road vehicle against side sway or lateral rocking movement relative to the car. By virtue of the compression of the springs of the spring couplings, the lateral hold-down devices may be made very taut at the outset, and subsequent development of any slack or looseness in them is prevented. At the same time, the spring couplings afford the lateral hold-down devices a quality of resiliency which safeguards them against rupture or distortion incident to sudden tensioning stresses from the road vehicle. Accordingly, the lateral hold-down devices on opposite sides of the road vehicle cooperate with each other to exercise a balancing effect on the road vehicle, holding it constantly under restraint against rocking movement and preventing the development of any slack or looseness in the lateral anchoring connections on the side toward which restrained rocking movement may occur. Consequently, any violent backlash following any lateral tilting of the road vehicle body is prevented. Not only do the spring couplings resist lateral tilting of the road vehicle body, but such resistance is progressively increased as the compression of the coupling springs is increased.

It is to be noted that the construction and organization of the equipment permits adjustment of the lateral hold-down devices to road vehicles of different lengths and widths and heights, and that more or less than two to a side may be easily and quickly installed to meet the requirements of the particular road vehicle, in regard to its weight, height, the weight and height of its cargo, etc.

It will be appreciated that the lateral hold-down devices, installed and operating as above described, exercise also substantial restraint against longitudinal shifting of the road vehicle on the carrying vehicle. However, further to secure the road vehicle against such longitudinal shifting, and moreover to safeguard the lateral hold-down devices against the results of excessive end shifting, I provide longitudinal hold-down devices, preferably arranging two of these at each end of the road vehicle. Each of these end hold-down devices comprises a spring coupling 40, preferably identical with the spring couplings 30, a connecting member in the nature of a chain 41, and a shortening device, which may be in the nature of a turnbuckle 42, a hook 44 being provided for securing the free end of the chain. The spring couplings 40 are connected to the U-shaped anchor bolts 26 in such fashion that they may rock or swing longitudinally of the car, a pair of the U-bolts being employed for the mounting of each of the spring couplings at the respective ends of the car, as seen in Fig. 3. On each pair of U-bolts 26 located at the middle of the car, viz., those illustrated at the right hand end of Figs. 1 and 2, two of the spring couplings are so mounted. Thus a pair of end hold-down devices is provided for cooperation with each end of each of two road vehicles loaded on the car. The free ends of the chains 41 are passed through the appropriately located anchorage connecting members G of the road vehicle frame, and drawn taut and engaged with the hooks 44. Then the turnbuckles 42 are operated to draw the end hold-down devices tense and place the springs of the spring couplings 40 under some compression.

With the end hold-down devices thus connected with its frame, the road vehicle is anchored against longitudinal shifting movement on the carrying vehicle, the end hold-down devices exercising a continuous restraint which is nevertheless resiliently yieldable to a limited extent. However, such permissive longitudinal movement is definitely limited to an extent which is less than might injure the lateral hold-down devices. The end hold-down devices also cooperate with the lateral hold-down devices to resist side sway or rocking movement of the road vehicle body.

To provide additional security for the road vehicle, it may be desirable to employ means for chocking its road wheels. An improved chocking device is illustrated in Figs. 5 and 6. One of these devices is provided for each of the rear or road wheels of the road vehicle, the form here shown being designed particularly for wheels of the twin type. It comprises a pair of angle members 50, adapted to rest on the car deck, and a connecting bar 51 which fits slidably in apertures in the upstanding flanges of said angle members. At one end the bar is provided with a series of pin apertures 52 adapted to receive a pin 54 to form a stop to prevent movement of the adjacent angle member off of the end of the bar. Adjacent its other end the bar is provided with a slot adapted to receive a wedge 55, which wedge is provided with a series of apertures adapted to receive a pin 56 to prevent withdrawal of the wedge from the bar slot. Four wedge-shaped chock blocks 57 are provided, same adapted to rest on the deck of the car with their vertical end faces abutting the upstanding flanges of the angle members 50.

The chock blocks being positioned on the deck in abutment with the forward or rearward tread portions of the wheel, the angle members 50 are then placed in abutment with the outer ends of the chock blocks, and the connecting bar 51 inserted between the pairs of chock blocks and between the tires of the twin wheels. One end of the bar is secured by the pin 54, and then the wedge 55 is driven into the slot in the other end of the bar, thus binding the bars firmly in engagement with the blocks and the blocks firmly in engagement with the tires. In order to anchor the chocking device to the car, the deck planking in areas of the deck upon which the rear wheels of the road vehicle rest, may be arranged with slight spaces between the planks, as represented in the portion designated 15′ in Fig. 2, and some of the chock blocks provided at their bottoms with anchoring members 58 adapted to engage in the spaces between the deck planks.

To provide for running the road vehicles onto and off of the carrying vehicle, I provide at the respective ends of the latter swinging aprons or platform extensions 60, which are hinged to the car deck so that they may swing down to a horizontal position or upwardly to a vertical position. Their length is such that in their lower position they may bridge the space between the decks of cars which are connected by the usual draft couplings, and in such position they afford runways over which the road vehicles may roll from one car to the other. In order to retain these aprons or platforms in their elevated or vertical position, I provide latch bars 61 adapted to interengage with their elevated portions, said latch bars being pivotally connected to posts 62 which are formed as upward extensions of the stakes 17 at the ends of the car.

From the foregoing it will be appreciated that the present apparatus provides a very secure, yet at the same time a very simple and adaptable, apparatus for transporting road vehicles on carrying vehicles and for maintaining the road vehicles securely in place during transportation. It will be seen also that the anchoring equipment is of such character and so arranged and organized in the apparatus as to safeguard both the road vehicle and the carrying vehicle against injury from movement of the former upon the latter. It will be noted also that the anchoring devices are so constructed and arranged as not to interfere with the loading of the road vehicle onto the carrying vehicle or to interfere with the use of the latter for the transportation of other kinds of freight. A particular advantage of the anchoring equipment is that it may be applied with facility to railway cars, barges, and the like, which are of standard construction, such application involving no material amount of cutting or piercing or other modification of the parts of such standard vehicles.

I claim:

1. Apparatus for transporting wheeled vehicles comprising an under-frame having side sills, a deck carried on said under-frame, guard rails detachably fixed to said side sills and extending longitudinally along and above the lateral marginal portions of said deck, anchor rails fixed to said guard rails and extending longitudinally thereof, anchor members retentively engaged with said anchor rails and adjustable longitudinally thereof, and flexible connecting devices attached to said anchor members and adapted to extend inwardly and upwardly for attachment to the under frame of a vehicle supported on said deck.

2. In a railway car having a deck portion for supporting a wheeled vehicle, a securing rig comprising, in combination, an anchor rail fixedly mounted on the car and extending longitudinally thereof adjacent a lateral margin of the deck, a hold-down device including a means retentively secured to said anchor rail and adjustable longitudinally thereon, said hold-down device having a portion adapted for attachment to a vehicle on the deck and including a lever operably associated with said portion and said means and operable to tension the hold-down device, and a keeper adjustably mounted on said anchor rail and engageable with said lever to retain it in effective position.

3. In a railway car, a securing rig as specified in claim 2 and wherein the said means of the hold-down device affords a flexible connection with the anchor rail and the lever has rocking connection with the keeper, whereby the hold-down device is permitted oscillatory movement laterally relative to the anchor rail.

4. A rig for securing a carried vehicle on a carrying vehicle, comprising, in combination, an anchor rail attached to the carrying vehicle, anchor means adjustable longitudinally of the anchor rail, a hold-down device having a portion adapted for attachment to the carried vehicle and another portion having rocking connection with said anchor means and a lever operably associated with said two portions and operable to tension the hold-down device between its points of connection with the carried vehicle and anchor means, and keeper means adjustable longitudinally of the anchor rail and adapted for retentive rocking engagement with a portion of said lever to retain the lever in an effective position.

5. A rig as specified in claim 2 and wherein the hold-down device includes a spring arranged to be stressed by operation of the lever.

6. A rig as specified in claim 2 and wherein the lever has a manually operable power arm of substantial length engageable with the keeper means at a distance from said anchor means.

7. Apparatus for transporting wheeled vehicles comprising an under-frame having side sills and transverse members, a deck carried on said underframe and affording space for carrying a wheeled vehicle, guard rails detachably fixed to said side sills and extending longitudinally along and above lateral portions of said deck which are outwardly beyond the position occupied by the load wheels and under-frame of the carried vehicle, flexible hold-down devices secured to said guard rails, and flexible hold-down devices connected to some of said transverse under-frame members at locations adjacent the median portion of said deck inwardly beyond the positions occupied by the road wheels of the carried vehicle, said flexible hold-down devices being adapted for attachment to the under-frame of a carried vehicle supported on said deck and including means operable to tension them longitudinally of themselves.

HOWARD B. ATHERTON.